United States Patent [19]
Toner

[11] 3,936,643
[45] Feb. 3, 1976

[54] X-RAY DENTAL FILM HOLDER

[75] Inventor: Anthony S. Toner, Walnut Creek, Calif.

[73] Assignee: Sterling Drug Inc., New York City, N.Y.

[22] Filed: Sept. 3, 1974

[21] Appl. No.: 502,758

[52] U.S. Cl. ............................ 250/478; 250/521
[51] Int. Cl.² ................................. G03B 41/18
[58] Field of Search ............... 250/478, 479, 521

[56] References Cited
UNITED STATES PATENTS

| | | | |
|---|---|---|---|
| 2,777,068 | 1/1957 | Bowser | 250/521 |
| 3,444,371 | 5/1969 | Via, Jr. | 250/521 |

*Primary Examiner*—Davis L. Willis
*Attorney, Agent, or Firm*—Charles R. Fay

[57] ABSTRACT

A disposable one-piece holder of molded styrofoam or similar lightweight material for dental X-ray film, comprising two integral portions one of which is relatively thin and is adapted for gripping by the teeth, and the other portion being in extension thereof and thicker and having an edge located at right angles to the plane of the thinner portion for holding the film.

1 Claim, 4 Drawing Figures

X-RAY DENTAL FILM HOLDER

BACKGROUND OF THE INVENTION

There have been suggestions for disposable one-piece dental X-ray film holders such as for instance as shown in Via U.S. Pat. No. 3,444,371 and the objects of the present invention are substantially similar to those disclosed in that patent but with the addition that the present invention provides a holder which is considerably smaller, less expensive, and easy to use, being disposable after a single use. The new disposable holder is "universal", that is it can be used to take bitewings or periapicals.

SUMMARY OF THE INVENTION

The present invention comprises a very simple and very small film holder which is made of expanded plastic material, e.g., styrofoam or the like. It comprises a thin portion to be held by the teeth, the teeth penetrating thereinto to hold it in a fixed position; and the thin portion has in extension thereof and integral therewith a relatively thicker portion, having a curved heel thereon so as to fit in the mouth better. The thicker portion is provided with a simple slot which is of a width to frictionally receive and hold the dental X-ray film.

While the present holder may be made from various suitable materials, expanded styrofoam give a light, soft durable material which the teeth can penetrate so that the film will not slip or move in the mouth.

It has been found that the bite portion i.e., the thin portion described above, need not be of substantial size, and also the expanded styrofoam is of such a nature as to securely grip the film but at the same time being easily removable therefrom.

In general, the present invention consists of a single molded expanded styrofoam device comprising a thin bite portion and a thicker slotted film holding portion having a rounded heel for comfortably fitting into the mouth while the bite portion is firmly held by the teeth. It can be used for bitewings or periapicals; it is small, taking up less space in the mouth, leaving the tongue substantially free and avoiding possible gagging; it is easy to adjust the film position; and is itself easier to handle.

PREFERRED EMBODIMENT OF THE INVENTION

Figure 1:
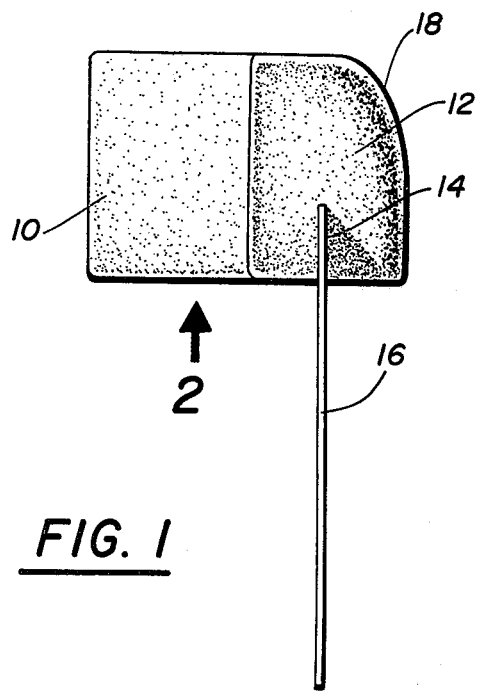
FIG. 1 is a view of the new X-ray film holder shown in elevation with the film in place.
Figure 2:
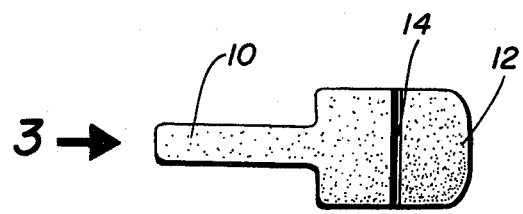
FIG. 2 is a view thereof looking in the direction of arrow 2 in FIG. 1 with the film removed.
Figure 3:
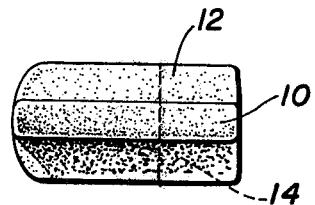
FIG. 3 is a view looking in the direction of arrow 3 in FIG. 2.
Figure 4:
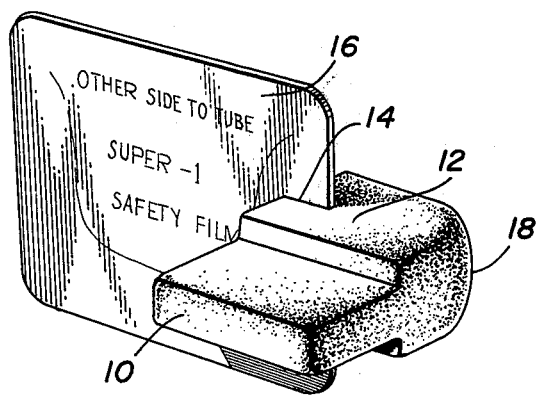
FIG. 4 is a perspective view with the film in place.

The present film holder comprises a single integral unitary molded body of soft material such as foamed or expanded cellular plastic material e.g., styrofoam. It comprises a relatively thin flat portion 10 adapted to be held in the teeth very comfortably, and a thicker portion 12 in extension of the thinner portion 10, the thickened portion 12 having a slot 14 therein at an edge thereof, said slot being generally at a right angle to the general plane of the thin bite portion 10 and extending only a short distance into the thicker portion 12 for the edgewise reception of the X-ray film 16. The slot is of a width to frictionally grasp the film and hold it firmly but at the same time the film is capable of quick and easy extraction after the exposure so that the film holding device is easily thrown away.

The holder is generally rectangular and is about evenly divided in the area between the thin portion 10 and the thick portion 12, and both portions have side surfaces that are planar and parallel.

Preferably the thickened film holding portion 12 is rounded at a heel portion 18 so that it accommodates itself better to the mouth.

In use the film holder is applied to the thickened portion 12 by insertion in slot 14 and the holder is then inserted into the mouth so that the film is disposed perpendicularly to the bite portion 1, so that the latter will be substantially parallel to the teeth which bite into the same so as to produce an accurate picture of the teeth.

As stated in the U.S. Pat. No. 3,444,371 identified above, the holder may be made of any suitable material which the teeth can comfortably penetrate without breaking or crumbling the material and it should also of course be non-toxic and can be of the foam or cellular plastic such as polystyrene, polyurethane, vinyl, or phenolic foam or the like being radiolucent to avoid shadows.

I claim:

1. A disposable one piece plastic holder for dental X-ray film said holder comprising a bite portion and a film holding portion which are integral, wherein the film-holding portion has a slot therein for frictional but separable reception of the X-ray film and wherein the slot is arranged perpendicularly with respect to the plane of the bite portion so that the film is held likewise in a perpendicular plane to the bite portion.

* * * * *